Feb. 5, 1957    H. GUTTON    2,780,805
DISPLAY SYSTEMS FOR RADAR
Filed April 1, 1953    4 Sheets-Sheet 1
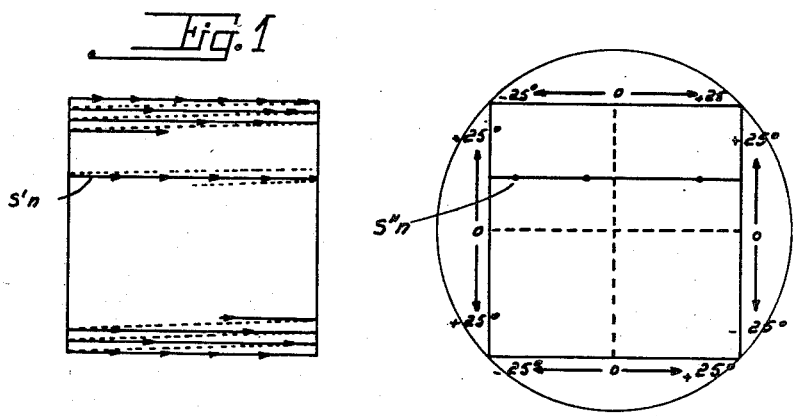
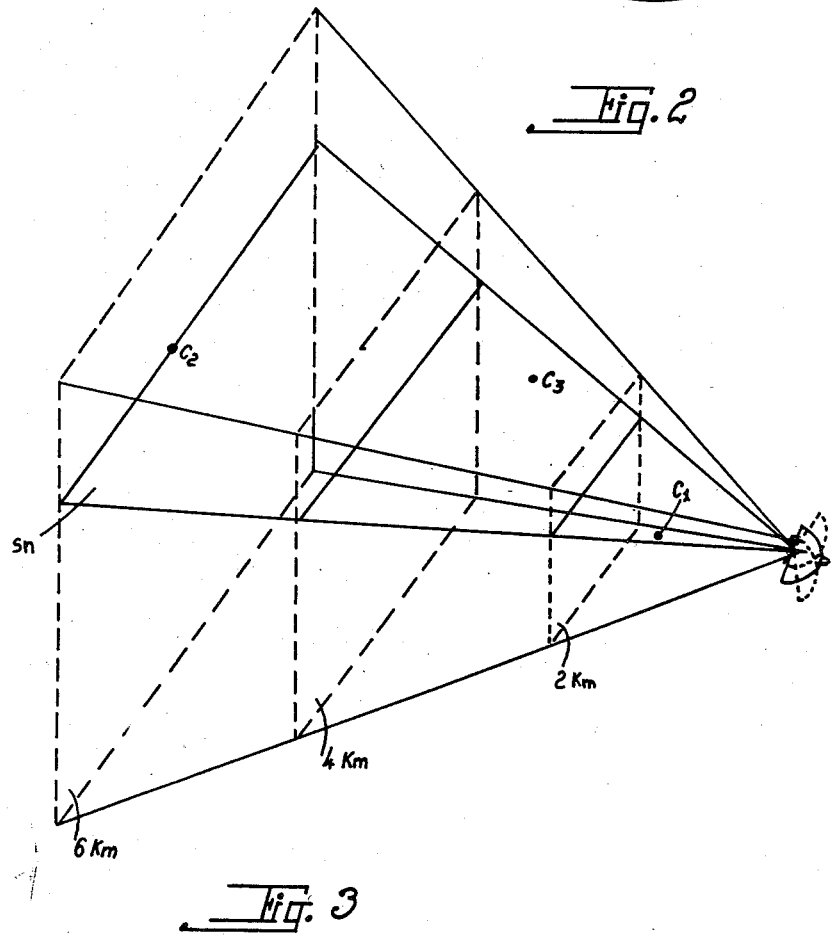

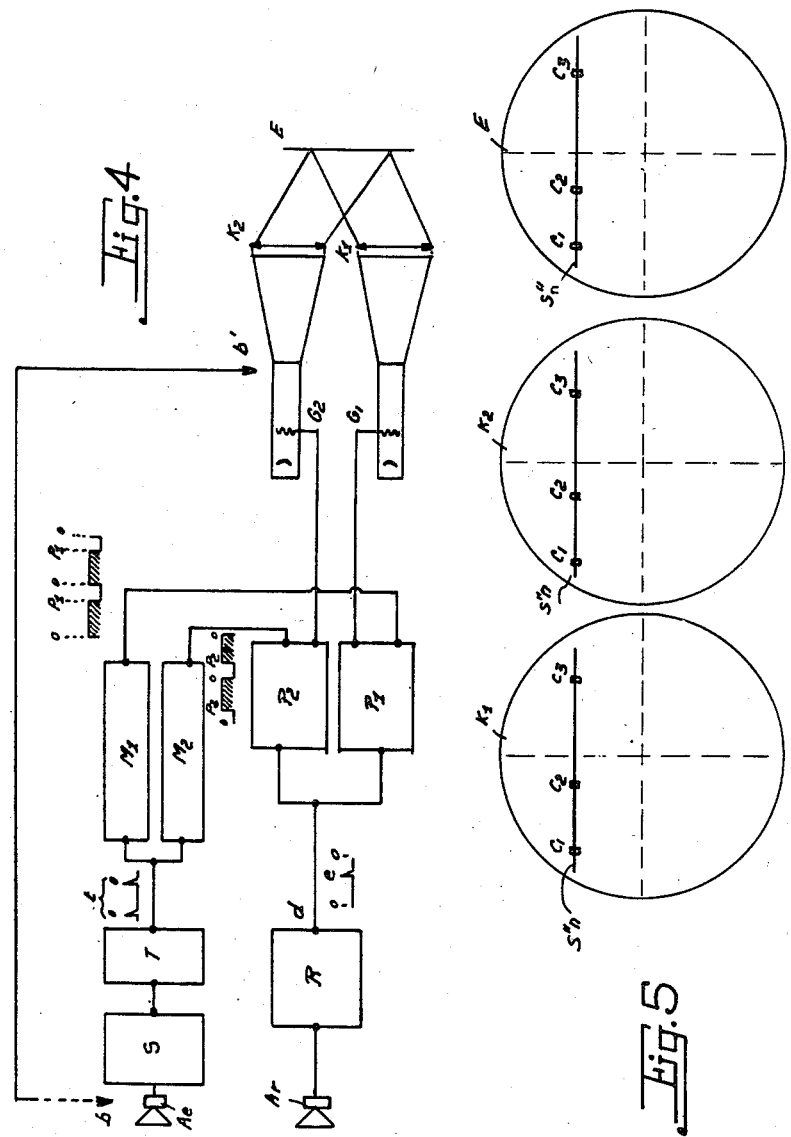

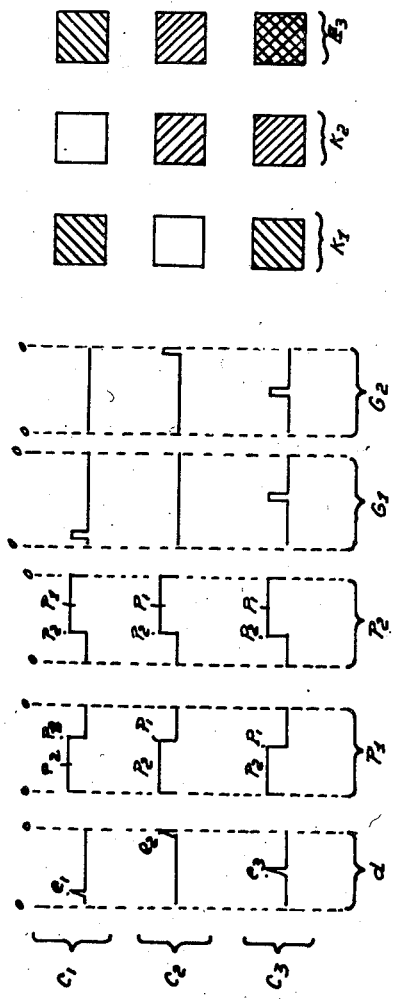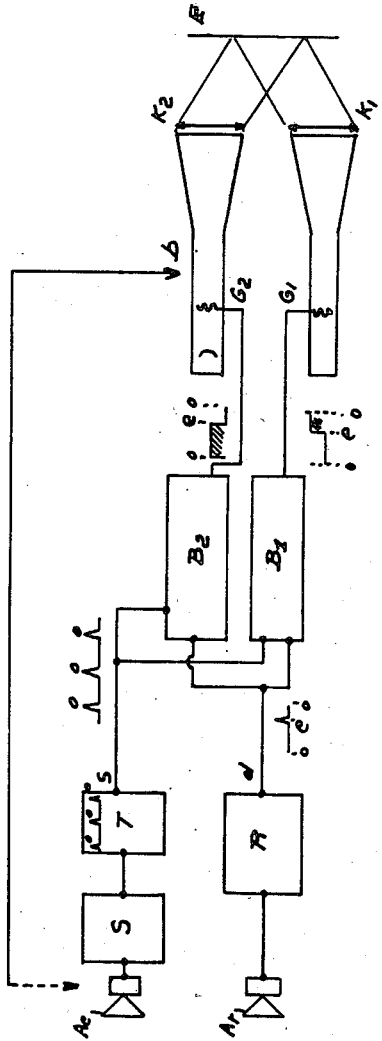

Feb. 5, 1957 H. GUTTON 2,780,805
DISPLAY SYSTEMS FOR RADAR
Filed April 1, 1953 4 Sheets-Sheet 4
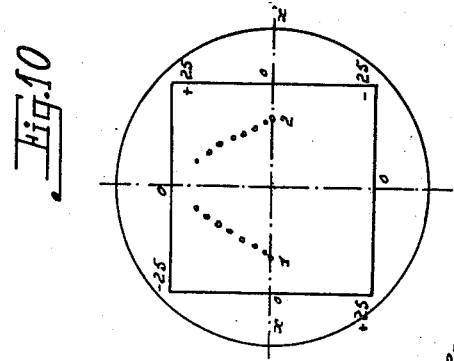
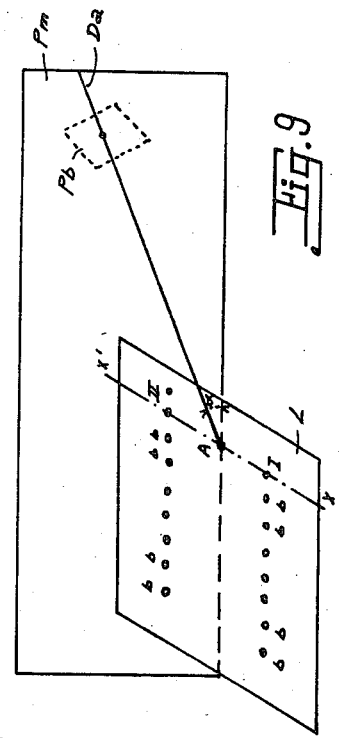
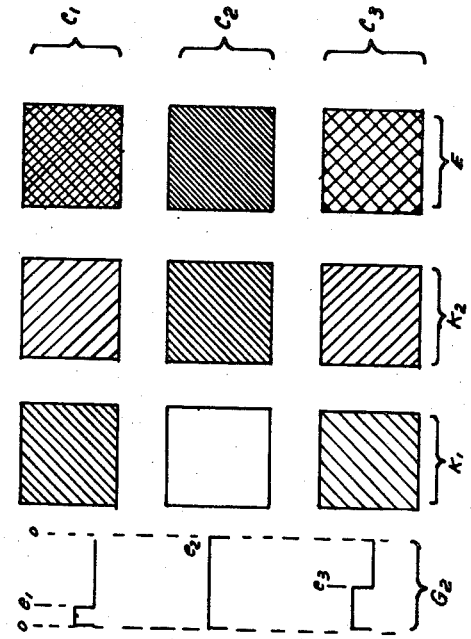
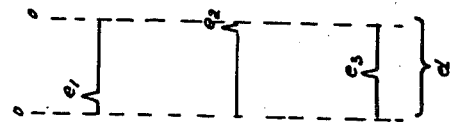

United States Patent Office 2,780,805
Patented Feb. 5, 1957

2,780,805
DISPLAY SYSTEMS FOR RADAR

Henri Gutton, Paris, France, assignor to Compagnie Generale de Telegraphie Sans Fil, a corporation of France Application April 1, 1953, Serial No. 346,203

Claims priority, application France April 17, 1952

6 Claims. (Cl. 343—13)

This invention relates to radar systems and more particularly to display systems for use therein.

There are many different types of radar display systems in use at the present time. For example with an A scan display the spot in the usual cathode ray tube is deflected along a time base and a target display in range only is obtained. In other displays the spot is subjected to co-ordinate deflections, one position coordinate, usually the horizontal, being representative of target azimuth and the other—usually the vertical—being representative of target elevation or height, which, being obviously related, may be regarded, for the purposes of the present specification, as interchangeable terms. Again in the P. P. I. type of display, the spot is subjected to two deflections, circular and radial, the former being used to indicate target azimuth and the latter target range. There is a number of other known display systems with a spot subjected to two simultaneous deflections but in none of them are more than two items of target information data—for example azimuth and elevation or azimuth and range—displayed simultaneously on the same screen. If three items are to be displayed—for example azimuth, elevation and range— two displays, each giving two items only, have had to be used.

Although this is satisfactory enough in many cases, in others, notably in air-borne radar systems, where the target information is rapidly changing, it is highly desirable to be able to give all the items of information in a quickly understandable form on one screen and the present invention enables this to be done, displaying azimuth, elevation and range simultaneously in a form which can be practically instantly understood.

According to this invention a radar system is provided with a display system in which two items of target information data are displayed by the position co-ordinates of a luminous spot on a screen and a third is displayed by the color of the said spot.

Preferably the horizontal position co-ordinate is used to display target azimuth, the vertical position co-ordinate is used to display target elevation and the color is used to display range.

In one embodiment of the invention a radar system comprises two similar cathode ray tubes with screens of different colors, a directional aerial system adapted to scan a pre-determined volume of space in azimuth and elevation, means for causing the spot in each of said tubes to scan the screen thereof in synchronism with the aerial scanning, means for feeding to one of said tubes echo signals from targets in a relatively adjacent part of the total effective range of the radar system, means for feeding to the other of said tubes echo signals from targets in a relatively remote part of the total effective range of the radar system, and an observer's screen on which the displays produced by the two tubes are superimposed whereby the position of a target spot on the observer's screen is representative of the azimuth and elevation of the target and the color thereof is compounded of the colors of the spot or spots produced on the tube or tubes thereby indicating target range by the resultant color.

The intensity of the spot produced in each tube may be constant, whereby the spot color in the observer's screen is either the same as that of one tube or is compounded of both, depending upon whether the target is in a sub-range appropriate to one or other only of said tubes or in a sub-range between said first mentioned subranges and appropriate to both tubes. Alternatively the spot intensity produced in each tube may be made dependent on the length of time of electronic bombardment of said spot, means being provided for making said length of time in one tube directly dependent on target range and in the other tube inversely dependent on target range whereby the resultant spot color in the observer's screen is made a function of target range. A color filter calibrated in range may be provided for viewing the observer's screen and by its aid range may be read off with reasonably good accuracy.

As will be seen later the invention also provides a blind landing system wherein a radar system in accordance with the invention is used in conjunction with an airfield having a runway or approach-landing path marked out with passive beacons, i. e. radar reflectors, on both sides.

The invention is illustrated in and further explained in connection with the accompanying drawings in which Figure 1 is a diagrammatic representation of the aerial scanning effected in an embodiment of this invention;

Figure 2 represents the scanning in the display cathode ray tubes in correspondence with the aerial scanning;

Figure 3 is a representation in perspective of a volume of space swept out by the aerial;

Figure 4 is a block diagram of one embodiment of the invention displaying target ranges in steps of range or sub-ranges;

Figure 5 is a schematic representation of target disappear at various points of the apparatus of Figure 4; and also on the observer's screen used therein.

Figure 6 is an explanatory diagram relating to the operation of Figure 4 showing the different signals which appear at various points of the apparatus of Figure 4;

Figure 7 shows similarly to Figure 4, a modification with continuous display of range as distinct from step-by-step display;

Figure 8 is an explanatory diagram like that of Figure 6 but relating to the apparatus of Figure 7;

Figure 9 is a perspective diagram illustrating the use of the invention to assist blind landing; and Figure 10 represents the observed picture when effecting blind landing, as in Figure 9, correctly.

The radar system now to be described comprises a directional aerial of known type e. g. a paraboloidal aerial, fed from a source of high frequency energy, and which is caused by known mechanical or electrical means to sweep out a rectangularly sectioned volume of space in a series of straight lines as conventionally represented in Figure 1. Assuming a very sharp highly directional beam with an angle of divergence of 1° there might be, to quote practical figures, 50 horizontal scanning lines which, with 50 scanning elements per line, would give 2,500 elements per scan. As will be seen later there are two display cathode ray tubes and in both of these the deflection of the spot is synchronised with the aerial scanning so that the raster on the screen of each tube is as represented in Figure 2, momentary horizontal position representing azimuth and momentary vertical position representing elevation.

Figure 3 represents in perspective the volume of space swept out. In the description that follows it will be assumed that this is the type of sweeping employed and also that the maximum design range of the radar system is 6 kilometres. With a radar system of the pulsed type, scanning with 2,500 elements per scan, if each scan is to be made in less than $1/10$ second and the maximum range is, as stated, to be 6 kilometres, the pulse repetition frequency must be of the order of 25.000 per second.

Suppose the aerial sweeps out the plane $S_n$ of Figure 3 corresponding to the straight lines $S_n'$ of Figure 1 and $S_n''$ of Figure 2, and that there are targets $C_1$, $C_2$, $C_3$ situated respectively at 1, 6, and 3 kilometres from the radar system. These targets produce echoes which after reception and detection are applied to a cathode ray tube whose sweep is synchronized with that of the aerial, accordingly luminous spots are produced on the straight line $S_n''$ at places corresponding to the respective azimuths of these targets as shown in Figure 2.

Figure 4 represents the range finding part of the system, it being presumed that the zone of ranges (0 to 6 kilometres) covered by the radar system is arbitrarily divided into three range parts namely 0 to 2 kilometres from the aerial, 2 to 4 kilometres from the aerial and 4 to 6 kilometres from the aerial.

Referring to Figure 4 T represents a synchronising time base unit which gives recurrent impulses of period $t$, and controls the transmitter S to cause it to emit very high frequency recurrent impulses of this repetition period $t$ from a directional transmitting aerial $Ae$. Received echoes from a target are received by the receiving aerial $Ar$ and detected by a receiver R. At $d$ will appear an echo signal $e$ whose time interval from the original transmitted impulse is proportional to the distance (range) of the target. Figure 4 shows two aerials, one for transmitting and one for receiving, but of course a single aerial may be used for both purposes as well known. The synchronising circuit T also controls two multivibrators $M_1$ and $M_2$ which deliver rectangular voltage waves or pulses of similar amplitude and duration, the duration being arbitrarily chosen and preferably equal to $2/3$ of the period $t$. The pulse supplied by multivibrator $M_1$ begins at the time corresponding to the occurrence of a synchronising impulse O and ends at a time $p_1$ which is $2/3$ $t$ after said synchronising impulse. The pulse tension supplied by the multivibrator $M_2$ begins at a time $p_2$, $1/3$ $t$ after the time of an original impulse O and ends when the next impulse O occurs. These two rectangular waves or pulses are applied respectively to gate two circuits $P_1$ and $P_2$ to which the echo signal from the receiver R is also applied. The gating circuits $P_1$ and $P_2$ allow the echo signal to pass only whilst they are "open" i. e. when gated by a pulse from $M_1$ or $M_2$ as the case may be. The outputs from the two circuits $P_1$ and $P_2$ are applied respectively to the two grids $G_1$, $G_2$ of two cathode ray display tubes $K_1$ and $K_2$.

The tubes $K_1$ and $K_2$ have screens fluorescing with different color for instance one may be red-orange and the other blue, these colours being represented in Figures 6 and 8 (to be described later) by cross hatching inclined one way for one colour and the other for the other. The tube screens have substantial after-glow and are such that the luminous intensity of the spot produced is practically independent of the length of time of the electron bombardment.

In Figure 5 are represented the two screens of the cathode ray tubes $K_1$ and $K_2$ and also an observer's screen E on which are optically projected in super-imposition the two images formed by the screens of tubes $K_1$ and $K_2$. The positions of the three spots which correspond to the three targets $C_1$, $C_2$ and $C_3$ are represented at $C_1$, $C_2$, $C_3$ on all three screens and the coloured indication of range is represented diagrammatically in Figure 6. Referring to Figure 6 the target $C_1$ occurs in the first range (0–2 kms.) and in the top part of Figure 6, alongside the bracket marked $C_1$, are shown the echo signal $e_1$ (occurring at $d$ in Figure 4), the voltage applied to gating amplifier $P_1$, the voltage applied to gating amplifier $P_2$, the signal applied at grid $G_1$ and the signal applied at grid $G_2$. Since the target $C_1$ is at a range of 1 km., the echo signal $e_1$ given thereby will occur at $1/6$ $t$ from the original time O, at which time the gating circuit $P_1$ is open so that the signal passes to grid $G_1$ whereas the circuit $P_2$ is blocked and no signal passes to the grid $G_2$. Therefore there will appear on the screen of the tube $K_1$ at a point corresponding to the azimuth and elevation of the target $C_1$ a luminous orange-red spot. There will be no spot on the screen of the tube $K_2$ and therefore the resulting color on the observer's screen E will be orange-red.

The target $C_2$ is in the third range (4–6 kms.). It is represented as being at the extreme range of 6 kilometres. As will be seen from the part of Figure 6 opposite the bracket $C_2$, only the gating amplifier $P_2$ is open when the echo is received and therefore a spot (blue in color) will appear on the screen of tube $K_2$ only. The spot on the observer's screen E will therefore also be blue. In Figure 6, as will be appreciated the columns of shaded rectangles represent color spots appearing on the three screens indicated by the brackets $K_1$, $K_2$ and $E_3$.

The target $C_3$ situated at 3 kilometres appears in second range (4–6 km.). When the echo from this target comes back both gating amplifiers $P_1$ and $P_2$ are open and accordingly luminous spots appear on the screens of both tubes. The resulting color on the observer's screen E is therefore a mixture of blue and orange-red. This is indicated by the cross-hatched rectangle in the horizontal row opposite bracket $C_3$ and the vertical column above bracket $E_3$.

Thus a target appears on the observer's screen E as orange-red if between 0 and 2 km., orange-red mixed with blue if between 2 and 4 km. and blue if between 4 and 6 km.

This division of total range into sub-ranges may be effected as desired in dependence upon the selection of the times $p_1$ and $p_2$, determining the opening and closing of the gating circuits $P_1$ and $P_2$ in the echo signal paths. The sub-ranges need not be equal, also there may be more than three sub-ranges, use of a higher number of sub-ranges obviously involving the use of more than two cathode ray tubes with differently colored screens, each fed through its own gated circuit (P) controlled by its own gate control circuit (M).

The arrangement of Figure 4 gives no continuous display of range, because it indicates only the sub-range in which a target lies. The arrangement of Figure 7 however gives continuous range display i. e. display of range in terms of color which changes smoothly with change of range instead of changing only in steps. In Figure 7 transmission and reception are effected as in Figure 4, like references indicating like parts in both figures.

In Figure 7 as in Figure 4 there are two cathode ray tubes $K_1$ and $K_2$ with screens fluorescing in different colors, e. g. orange-red for tube $K_1$ and blue for tube $K_2$. These tubes are so operated however, and their screens are such that the luminous intensity of the spot depends on the time duration of electronic bombardment, being as nearly as possible linearly proportional to that time. Such screens are well known and available. Deflection is effected in the two tubes in synchronisation with the aerial scanning as in Figure 4 so that the positions of targets in azimuth and elevation are displayed as in Figure 5. The grids of tubes $K_1$ and $K_2$ are fed with the outputs of two pulse circuits $B_1$ $B_2$ respectively, each jointly controlled by the echo signals at point $d$ and synchronising signals from the time base circuit T. The pulse circuit $B_1$ is arranged to deliver a rectangular wave or pulse which commences when an echo signal is received and terminates with the next following synchronising signal from circuit T. Circuit $B_2$ delivers a pulse which starts with a synchronising signal and terminates with the next following echo signal. Figure 8 shows in manner similar to that adopted in Figure 6 the operation of the arrangement of Figure 7.

Referring to Figure 8 the echo $e_1$ from a target $C_1$ at a range of 1 km. will occur at $\frac{1}{6} t$ after a synchronising impulse O and circuit $B_1$ will deliver to grid $G_1$ a pulse starting at the time the echo $e_1$ is received and continuing till the next impulse O. This pulse will therefore be $\frac{5}{6} t$ long and the luminous intensity of the spot corresponding to target $C_1$ on the screen of tube $K_1$ will be proportional to $\frac{5}{6} t$. The pulse delivered by circuit $B_2$ to the grid $G_2$ starts at the time O and will be $\frac{1}{6} t$ long so that the luminous intensity of the spot corresponding to target $C_1$ on tube $K_2$ will be proportional to $\frac{1}{6} t$. Therefore the luminous spot on the observer's screen E corresponding to target $C_1$ will be composed of $\frac{5}{6}$ of the color of tube $K_1$ and $\frac{1}{6}$ of the color of tube $K_2$, that is to say $\frac{5}{6}$ orange-red and $\frac{1}{6}$ blue. The result is illustrated in Figure 6 (top line above bracket E) the density of the shading being intended to indicate resultant color.

For a target at $C_2$, situated at 6 km., circuit $B_2$ only will deliver a pulse output of duration $t$ starting at time O. The resulting picture on the observer's screen E will, therefore, be blue. For the target $C_3$ situated at 3 km., the luminous spot on the screen E will be $\frac{3}{6}$ orange-red and $\frac{3}{6}$ blue.

Summarizing, the quantity of orange-red contained in the luminous spot produced on the screen E will be, for each target, inversely proportional to the range thereof, while the quantity of blue will be directly proportional to the range. Thus near targets will appear red-orange, grading off to blue for distant targets.

By using a calibrated color filter to observe the spots on the observer's screen, the filter being calibrated in range, it is possible to read off target ranges with useful precision.

Air-borne radar equipment with display apparatus as above described will not only give the pilot an easily read indication of what is in front of him, but is also of great assistance in blind-landing on an airfield the landing runway of which is marked out by passive beacons (radar reflectors) on either side.

This is illustrated in Figure 9 in which L represents an airfield with reflector beacons $b$ in two parallel rows one each side of the landing runway. The two entry beacons of the track are marked I and II and define a straight line $XX'$ at right angles to the runway. It is assumed that the radar is in the nose of the aircraft and the aerial sweeps out the space in front, the axis of the aircraft being in the line $D\alpha$ running perpendicularly through the centre of the broken line rectangle which represents the periphery of the area swept out by the display tubes. The pilot will therefore see when he flies towards the runway, a picture of the beacons on the observer's screen E and when this picture is as represented in Figure 10 the aircraft will have its axis through the point A midway between the beacons I and II at the entrance to the runway, this axis being situated in the plane $Pm$ perpendicular to the ground and equi-distant from the two lines of beacons, since the image of these latter is symmetrical in relation to the vertical axis of the screen and since the two beacons I and II give images 1 and 2 on the screen E situated on the horizontal axis $xx'$ of this screen. If the pilot flies so as constantly to maintain such a picture he will approach the track at an angle $\alpha$ which is constant, its axis coinciding always with the straight line $D\alpha$ which represents the correct landing direction. The colors of the representations of the beacons will indicate to the pilot his distance from the entrance to the track and inform him of the correct time to flatten out and land.

Semi-automatic assistance in landing can be obtained by arranging to reduce the sensitivity of the receiver for a suitable short time after the transmission of an impulse by giving the circuits $B_1$ and $B_2$ a suitable moderately high time-constant so that echoes corresponding to very close obstacles are not displayed. This provision is, indeed, advantageous in most cases because, as is well known, the beginning of a period immediately after a transmission pulse is always liable to disturbance by local reflections, reaction of the transmitting circuits on receiving circuits and "clutter" generally. With such provision, when the aircraft is sufficiently near the entrance to the runway, the images of the beacons I and II will disappear out and the pilot will then obtain on his observer's screen the images of the following beacons.

Although one of the items of target information data displayed has been referred to throughout as elevation it will be obvious that this is related to height and the term elevation is therefore used in a broad sense to include height.

I claim:

1. Radio direction finding and distance measuring equipment of the type comprising a transmitter for generating ultra high frequency energy; a pulse generator for pulse modulating said energy; means for radiating and concentrating said modulated energy in a thin beam; means for scanning with said beam, according to a predetermined recurrent law, a predetermined portion of space; and a receiver adapted to receive the wave reflected by targets located in said portion of space, said receiver comprising: a first and a second output circuits, a first and a second cathode ray oscillographs each having at least a display screen and a control electrode, said display screens being of different color of luminescence and having a suitable persistence, and means for producing an electron beam, and for scanning said respective display screens with the beams in accordance and in synchronism with said law; gating means for connecting said first and said second output circuits to said control electrodes of said first and second oscillographs respectively; means comprising a first and a second square wave generator for alternately blocking and unblocking said gating means during at least a fraction of the repetition period of said transmitted pulses; means for controlling said first and said second square wave generators by said pulse generator; a translucid screen; and optical means for superimposing respective images of said first and said second display screens on said translucid screen whereby the color of the image obtained on said translucid screen provides an indication of the target range.

2. Radio direction finding and distance measuring equipment of the type comprising a transmitter for generating ultra high frequency energy; a pulse generator for pulse modulating said energy; means for radiating and concentrating said modulated energy in a thin beam; means for scanning with said beam, according to a predetermined recurrent law, a predetermined portion of space; and a receiver adapted to receive the wave reflected by targets located in said portion of space, said receiver comprising: a first and a second output circuits, a first and a second cathode ray oscillographs having each at least a display screen, and a control electrode, said display screens being of different color of luminescence and having a suitable persistence; means for producing electron beams, and for scanning said respective display screens with the beams in accordance and in synchronism with said law; means for connecting respectively to said first and said second outputs of said receiver said control electrodes of said first and said second oscillographs, said means comprising; a first and a second multivibrators for generating overlapping pulses or square wave voltages of equal amplitude and equal duration; means for synchronizing said first and second multivibrators with said pulse generator, in such a way as to give to said square wave voltages the period of recurrence of the pulses generated by said generator, the respective beginning of a square voltage generated by the first multivibrator and the respective end of a square voltage generated by said second, multivibrator occurring when a pulse is produced, said duration being at least equal to half said period of recurrence of said pulses, and at most equal to said period; a translucid screen; and optical means for superimposing respective images of said first and said second display screens on said translucid screen whereby the image may appear either in one of the two colors proper to each screen, or in a color resulting from compounding, in equal proportions, these two colors, thus providing an indication as to the portion of space wherein the target is located.

3. An equipment according to claim 2, wherein said duration of said square wave voltages is equal to ⅔ of the period of recurrence of said pulses whereby the compound of the two characteristic colors vary linearly with the range of the target.

4. Radio direction finding and distance measuring equipment of the type comprising a transmitter for generating ultra high frequency energy; a pulse generator for pulse modulating said energy; means for radiating and concentrating said modulated energy in a thin beam; means for scanning with said beam, according to a predetermined recurrent law, a predetermined portion of space; and a receiver adapted to receive the wave reflected by targets located in said portion of space, said receiver comprising: a first and a second output circuits; a first and a second cathode ray oscillographs having each at least a display screen and a control electrode, said display screens being of different color of luminescence and having a suitable persistence; means for producing electron beams, and for scanning said respective display screens with the beams in accordance and in synchronism with said law; means for connecting respectively to said first and said second outputs of said receiver said control electrodes of said first and said second oscillographs, said means comprising: a first and a second bi-stable trigger having respectively a first and a second input and an output; means for maintaining at said output of each of said triggers voltage of zero value when feeding a pulse at said first input, said voltage remaining at zero value, until a pulse is fed at said second input, the voltage taking on, at this time, another predetermined constant value, the latter value prevailing until a pulse is fed at said first input; means for connecting respectively said first input of said first trigger and said second input of said second trigger to said first and said second outputs of said receiver, said second input of said first trigger, and said first input of said second trigger to said pulse generator and said output of said first trigger and said second trigger, to the control electrode of said first oscillograph, and to the control electrode of said second oscillograph; a translucid screen; and optical means for superimposing respective images of said first and said second display screens on said translucid screen.

5. An equipment according to claim 4 further comprising a linear scale having color varying progressively and linearly from one end to the other from the color of the display screen of said first oscillograph to the color of the display screen of said second oscillograph, said scale being graduated in distance, and means for displacing said scale along said translucid screen, thereby to estimate the respective ranges of the targets located in said portion of space by means of comparison of colors.

6. Equipment according to claim 5 wherein said scale is a translucid filter whereby each image over said translucid screen is cancelled by a small portion of said filter, said small portion facing the number estimating the range of the corresponding target.

References Cited in the file of this patent
UNITED STATES PATENTS

| | | |
|---|---|---|
| 2,403,527 | Hershberger | July 9, 1946 |
| 2,508,358 | Ayres | May 23, 1950 |
| 2,514,828 | Ayres | July 11, 1950 |
| 2,634,411 | Wallace | Apr. 7, 1953 |